United States Patent
Yoon et al.

(10) Patent No.: US 9,858,635 B2
(45) Date of Patent: Jan. 2, 2018

(54) APPLICATION PROCESSOR SHARING RESOURCE BASED ON IMAGE RESOLUTION AND DEVICES INCLUDING SAME

(71) Applicants: Sang Chul Yoon, Hwaseong-si (KR); Seong Woon Kim, Suwon-si (KR); Sang Hoon Lee, Seoul (KR)

(72) Inventors: Sang Chul Yoon, Hwaseong-si (KR); Seong Woon Kim, Suwon-si (KR); Sang Hoon Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 126 days.

(21) Appl. No.: 14/845,558

(22) Filed: Sep. 4, 2015

(65) Prior Publication Data

US 2016/0098812 A1    Apr. 7, 2016

(30) Foreign Application Priority Data

Oct. 7, 2014   (KR) .................. 10-2014-0135086

(51) Int. Cl.
   *G06T 1/20*   (2006.01)
   *G06T 3/40*   (2006.01)
(52) U.S. Cl.
   CPC .............. *G06T 1/20* (2013.01); *G06T 3/4092* (2013.01)
(58) Field of Classification Search
   None
   See application file for complete search history.

(56) References Cited

U.S. PATENT DOCUMENTS

| | | | |
|---|---|---|---|
| 6,347,154 B1* | 2/2002 | Karanovic | H04N 7/01 |
| | | | 348/E7.003 |
| 7,215,708 B2 | 5/2007 | Gagarin et al. | |
| 7,536,062 B2 | 5/2009 | Lippincott | |
| 7,903,126 B2 | 3/2011 | Yamada | |
| 8,405,678 B2 | 3/2013 | Cheng et al. | |
| 8,634,695 B2 | 1/2014 | Amin et al. | |
| 2004/0222941 A1 | 11/2004 | Wong et al. | |
| 2005/0262444 A1 | 11/2005 | Kizaki et al. | |
| 2006/0012616 A1 | 1/2006 | Paek | |
| 2009/0003730 A1* | 1/2009 | Pande | G06T 3/4007 |
| | | | 382/298 |
| 2010/0033621 A1 | 2/2010 | Chang et al. | |
| 2010/0172599 A1 | 7/2010 | Choi | |
| 2013/0222413 A1* | 8/2013 | Tripathi | G09G 5/02 |
| | | | 345/600 |

FOREIGN PATENT DOCUMENTS

| | | |
|---|---|---|
| JP | 2008116812 | 5/2008 |
| KR | 0634999 | 10/2006 |
| KR | 0744526 B1 | 7/2007 |

* cited by examiner

*Primary Examiner* — Xiao Wu
*Assistant Examiner* — Steven Elbinger
(74) *Attorney, Agent, or Firm* — Volentine & Whitt, PLLC

(57) ABSTRACT

An application processor includes a first scaler including a first vertical scaler and a first horizontal scaler, and a second scaler including a second vertical scaler and a second horizontal scaler, wherein the second vertical scaler is selectively shared between the first scaler and the second scaler in response to a determination of resolution for an image being processed.

19 Claims, 11 Drawing Sheets

(a)

(b)

United States Patent US 9,858,635 B2

APPLICATION PROCESSOR SHARING RESOURCE BASED ON IMAGE RESOLUTION AND DEVICES INCLUDING SAME

CROSS-REFERENCE TO RELATED APPLICATION

This application claims priority under 35 U.S.C. §119(a) from Korean Patent Application No. 10-2014-0135086 filed on Oct. 7, 2014, the disclosure of which is hereby incorporated by reference in its entirety.

BACKGROUND

Embodiments of the inventive concept relate to integrated circuits, and more particularly to application processors capable of sharing a resource based on an image resolution. Other embodiments of the inventive concept relate to devices including such application processors.

Many contemporary displays are capable of displaying images in more than one resolution. The possibility of receiving image data defined according to different resolutions places increased processing burdens upon processors in image processing systems. The size of image data is a function of resolution, and as resolutions have become greater, the performance and bandwidth provided by a display have become increasingly important. Greater resolution of the constituent display increases power consumption. In order to reduce the power consumption, the use of memory-to-memory transfer operations has increased.

In order to scale-down an image through an on-the fly operation, a competent scaler must read a large amount of data at a fixed data rate from memory, and then scale (up or down) the data. A scale-down ratio for the scaler may be restricted based on internal throughput of a scaler. When the internal throughput of a scaler is increased to increase the scale-down ratio, the resulting layout area of the scaler is increased. Accordingly, manufacturing costs associated with the scaler and/or an application processor incorporating the scaler are increased.

SUMMARY

In one embodiment, the inventive concepts provides an application processor including; a first scaler including a first vertical scaler and a first horizontal scaler; and a second scaler including a second vertical scaler and a second horizontal scaler, wherein the second vertical scaler is shared between the first scaler and the second scaler.

In another embodiment, the inventive concepts provides a system on chip including; an image source that provides images including a first image, a second image, and a third image, each having one of a plurality of image types including a first image type and a second image type, a first scaler including a first vertical scaler and a first horizontal scaler, and a second scaler including a second vertical scaler and a second horizontal scaler, wherein upon determining that the first image and the second image are respectively first image type, the first vertical scaler vertically scales a first group of pixels corresponding to the first image, and in parallel, the second vertical scaler vertically scales a second group of pixels corresponding to the second image, and upon determining that the third image is second type, the first vertical scaler together with the second vertical scaler vertically scale a third group of pixels corresponding to the third image.

In another embodiment, the inventive concepts provides a method of operating an image processing system including a processor including N direct memory access (DMA) controllers, a switch matrix, and M scalers, wherein each one of the M scalers includes a vertical scaler and a horizontal scaler, and 'N' and 'M' are natural numbers greater than two. The method includes; providing an image from an image source to the processor, determining an image type for the image based on resolution of the image, generating a selection signal in response to the determination of the image type, and configuring the switch matrix in response to the selection signal to selectively configured an arrangement of DMA controllers and scalers to process an image, wherein upon determining that the image is first image type, the arrangement of DMA controllers and scalers includes Q DMA controllers, Q vertical scalers and Q horizontal scalers, 'Q' being a natural number less than N and M, and upon determining that the image is second image type, the arrangement of DMA controllers and scalers includes R DMA controllers, P vertical scalers and R horizontal scalers, where 'R' is a natural number less than Q, and 'P' is a natural number greater than R.

BRIEF DESCRIPTION OF THE DRAWINGS

These and/or other aspects and advantages of the inventive concept will become apparent and more readily appreciated from the following description of the embodiments taken in conjunction with the accompanying drawings of which.

DETAILED DESCRIPTION

The inventive concept will now be described in some additional detail with reference to the accompanying drawings in which embodiments of the inventive concept are shown. The inventive concept may, however, be embodied in many different forms and should not be construed as being limited to only the illustrated embodiments. Rather, these embodiments are provided so that this disclosure will be thorough and complete, and will fully convey the scope of the inventive concept to those skilled in the art. Throughout the written description and drawings, like reference numbers and labels are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
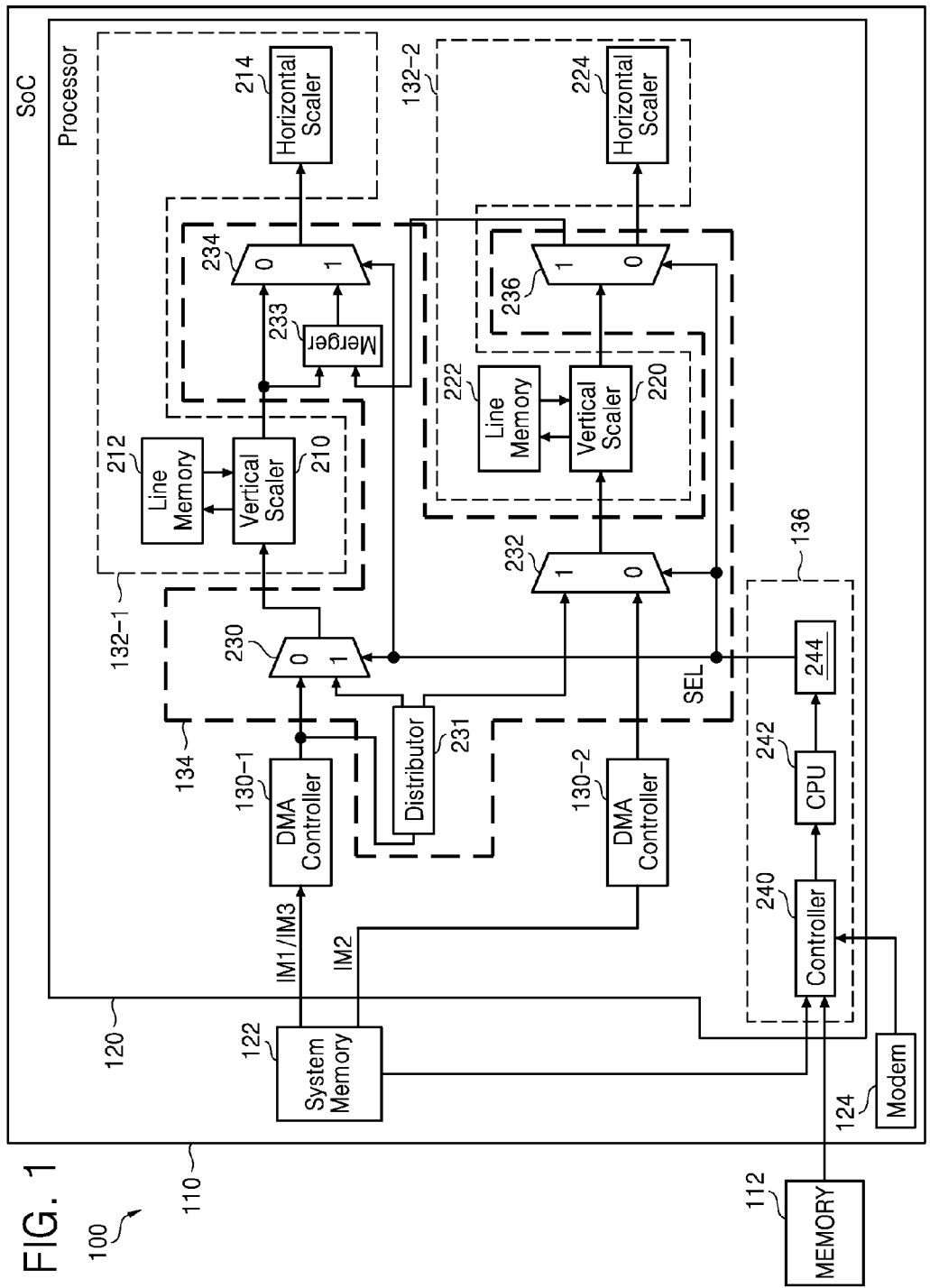
FIG. 1 is a block diagram illustrating an image processing system according to an embodiment of the inventive concept.

FIG. 1 is a block diagram illustrating an image processing system according to an embodiment of the inventive concept. Referring to FIG. 1, an image processing system 100 generally comprises a processing circuit 110 and a memory 112. The image processing system 100 may be a personal computer (PC), a desktop computer, a laptop computer, a workstation computer, or a portable (or mobile) computing device, where the portable computing device may be embodied as a mobile phone, a smart phone, a tablet PC, a mobile internet device (MID), a multimedia device, a digital camera, a camcorder, or a wearable computer.

The processing circuit 110 may be embodied as an integrated circuit (IC), a system on chip (SoC), an application processor (AP), or a mobile AP. The processing circuit 110 illustrated in FIG. 1 generally includes a processor 120 and a system memory 122. However, in certain embodiments of the inventive concept, the processing circuit 110 will further include a modem 124. Here, the processor 120 may be embodied as an IC, an AP, or a mobile AP. Data received via the modem 124 may be stored in the system memory 122 under the control of a controller 240. In the description that follows, the data stored in the system memory 122 is assumed to include image data sets corresponding to images IM1, IM2, and IM3.

The processor 120 may include multiple DMA controllers, such as DMA controllers 130-1 and 130-2, as well as a first scaler 132-1, a second scaler 132-2, a selection circuit 134, and a selection signal generation circuit 136. The first DMA controller 130-1 may be used to read a first image IM1 having a first resolution, or a third image IM3 having a second resolution different from (e.g., greater than) the first resolution from the system memory 122. After reading of the first image IM1 or third image IM3, the first DMA controller 130-1 transfers the first image IM1 or the third image IM3 to the selection circuit 134. For example, the first image IM1 may be a high-definition (HD) image, and the third image IM3 may be an ultra-high definition (UHD) image, however the scope of the inventive concept is not limited to only this image resolution relationship.

In similar manner, the second DMA controller 130-2 may be used to read a second image IM2 having the first resolution from the system memory 122, and transfers the second image IM2 to the selection circuit 134. Thus, a single image frame may include the first image IM1 and the second image IM2.

Although only two (2) DMA controllers 130-1 and 130-2 and two (2) scalers 132-1 and 132-2 are shown in FIG. 1, embodiments of the inventive concept may include any reasonable number of DMA controllers and scalers, where the number of DMA controllers used may be different from or the same as the number of the scalers.

The selection signal generation circuit 136 may be used to determine a type of each of the images IM1, IM2, and IM3 based on the resolution of each of the images IM1, IM2, and IM3 to be processed by the processor 120, and in response to this determination, the selection signal generation circuit 136 will generate a corresponding selection signal SEL. Each of the images IM1, IM2, and IM3 may be scaled (e.g., scaled-down or scaled-up) by each of the scalers 132-1 and 132-2 on the fly.

A "first type image" may be determined when an image (e.g., either one of images IM1 and IM2) has the first resolution, while a "second type image" may be determined when an image (e.g., image IM3) has the second resolution. In this regard, more than two (2) image resolutions may be determined by the selection signal generation circuit 136 as more than two (2) corresponding image types. The selection signal generation circuit 136 may determine an image type based on resolution of the image transferred from an "image source", such as the memory 112, system memory 122, and/or modem 124, and generate a selection signal SEL corresponding to the determination result. In certain embodiments of the inventive concept including a camera, for example, the camera may be the image source providing images.

The memory 112 shown in FIG. 1 may be embodied as a hard disk drive (HDD), a solid state drive (SSD), a secure digital (SD) card, a multimedia card (MMC), an embedded MMC (eMMC), a universal serial bus (USB) flash drive, or a universal flash storage (USF). In certain embodiments of the inventive concept, the memory 112 will be a removable memory.

The system memory 122 may be embodied as a random access memory (RAM), a dynamic RAM (DRAM), a static RAM (SRAM), a flash memory, a phase change RAM (PRAM), a resistive RAM (RRAM), and/or a spin-transfer torque random-access memory (STT-MRAM).

The selection signal generation circuit 136 illustrated in FIG. 1 includes the controller 240, a Central Processing Unit (CPU) 242, and a selection signal generator 244. Here, the controller 240 may be used to determine the image type based on the resolution of the image to be processed by the processor 120, and transfer "image type information" corresponding to a determination result generated by the CPU 242. In turn, the CPU 242 transfers "selection information" to the selection signal generator 244 based on the image type information. In certain embodiments, the selection signal generator 244 may be embodied as a register (e.g., a special function register—SFR) storing data associated with the selection information, and in such cases, the register may be used to generate the selection signal SEL based on the selection information provided by the CPU 242.

Additionally, the CPU 242 may be used to control the operation (e.g., enabling/disabling) of the DMA controllers 130-1 and 130-2 based on the image type information generated by the controller 240. An enabled DMA controller may read or fetch image data (or pixels) corresponding to each one of the images IM1, IM2, and IM3, as stored in the system memory 122 and under the control of the CPU 242. For example, extending the working example illustrated in FIG. 1, when an image generated using the first resolution is to be processed by the processor 120, the selection signal generation circuit 136 may output a selection signal SEL having a first level (e.g., a logically low level, or bit value of '0') to the selection circuit 134. However, when an image generated using the second resolution is to be processed by the processor 120, the selection signal generation circuit 136 may output a selection signal SEL having a second level (e.g., a logically high level, or a bit value of '1') to the selection circuit 134.

In FIG. 1, the selection circuit 134 includes a first selector 230, a second selector 232, a third selector 234, a fourth selector 236, and a distributor 231. In the illustrated embodiment of FIG. 1, the first, second and third selectors 230, 232, and 234 are embodied as multiplexers, and the fourth selector 236 is embodied as a de-multiplexer.

Figure 2:
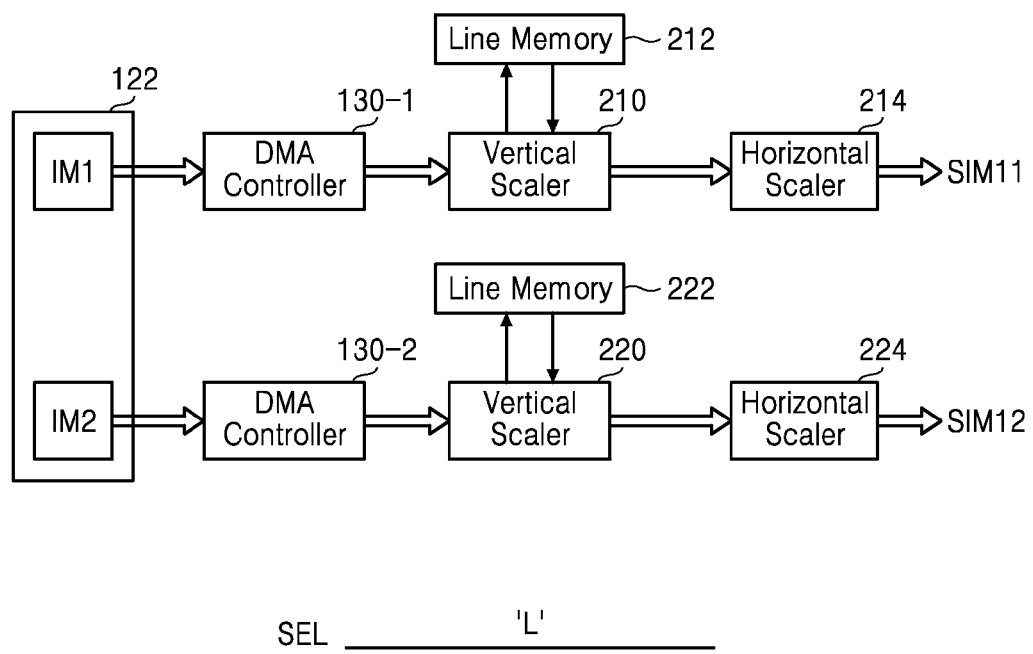
FIG. 2 is a block diagram further describing operation of the scalers shown in FIG. 1 that scale images having a first resolution.

FIG. 2 is a block diagram describing the operation of the scalers shown in FIG. 1 that scale images having the first resolution. When the selection signal generation circuit 136 is assumed to output a low selection signal SEL, the operation of the first and second scalers 132-1 and 132-2 may be understood from the following description in conjunction with FIGS. 1 and 2.

When an image to be processed by the processor 120 has the first resolution, each of the DMA controllers 130-1 and 130-2 is enabled by the CPU 242. Moreover, it is assumed that each of the DMA controllers 130-1 and 130-2 includes a memory (or buffer) capable of storing pixels included in one or more lines of each of the images IM1 and IM2, so as to reduce a read access frequency with respect to the system memory 122.

The first DMA controller 130-1 is connected to a first vertical scaler 210 through the first selector 230, while the second DMA controller 130-2 is connected to a second vertical scaler 220 through the second selector 232. Here, the first vertical scaler 210 is connected to a first horizontal scaler 214 through the third selector 234, and the second vertical scaler 220 is connected to a second horizontal scaler 224 through the fourth selector 236.

The first horizontal scaler 214 has the largest pixel throughput among the first vertical scaler 210, the first horizontal scaler 214, the second vertical scaler 220, and the second horizontal scaler 224, where "pixel throughput" is defined by a number of pixels processed per clock period.

Thus, the first horizontal scaler 214 will be designed to maximize pixel throughput, while the second vertical scaler 220 among the remaining scalers 210, 220, and 224 will be designed for use with the first scaler 132-1 based on the resolution of an image to be scaled. Accordingly, the processor 120 or the processing circuit 110 according to embodiments of the inventive concept may efficiently adjust a number of resources (e.g., scalers) based on the resolution of the image to-be-scaled.

The first DMA controller 130-1 may read (or fetch) the first image IM1 having first resolution from the system memory 122, and transfer the fetched first image IM1 to the first vertical scaler 210 through the first selector 230. In parallel with this operation of the first DMA controller 130-1, the second DMA controller 130-2 may fetch the second image IM2 having first resolution from the system memory 122, and transfer the fetched second image IM2 to the second vertical scaler 220 through the second selector 232. At this time, the first image IM1 and the second image IM2 may compose one frame, where each of the first and second images IM1 and IM2 include a plurality of pixels. In this context, "pixels" may be understood as image data having a particular format (e.g., RGB format, YCbCr format or YUV format). Further, the plurality of pixels may be understood as being arranged in the set image data corresponding to an image in a plurality of lines.

With continued reference to FIGS. 1 and 2, the first vertical scaler 210 may store pixels included in the first image IM1 transferred from the first DMA controller 130-1 in a first line memory 212, perform vertical scaling on the pixels stored in the first line memory 212, and transmit vertically scaled pixels to the first horizontal scaler 214 through the third selector 234. In parallel with the operation of the first vertical scaler 210, the second vertical scaler 220 may store pixels included in the second image IM2 transferred from the second DMA controller 130-2 in a second line memory 222, perform vertical scaling on the pixels stored in the second line memory 222, and transmit vertically scaled pixels to the second horizontal scaler 224 through the fourth selector 236.

The first horizontal scaler 214 may perform horizontal scaling on the vertically scaled pixels received through the third selector 234, and output the resulting horizontally scaled pixels SIM11. In parallel with the operation of the first horizontal scaler 214, the second horizontal scaler 224 may perform horizontal scaling on the vertically scaled pixels received through the fourth selector 236, and output the resulting horizontally scaled pixels SIM12.

As described above, when the selection signal generation circuit 136 generates a first level (low) selection signal SEL each of the scalers 132-1 and 132-2 may, independently, vertically and horizontally scale pixels corresponding to the first and second images IM1 and IM2 in order to generate vertically and horizontally scaled pixels SIM11 and SIM12. Each of the scalers 132-1 and 132-2 may perform a scale-up (or up-scale) operation or a scale-down (down-scale) operation.

Figure 3:
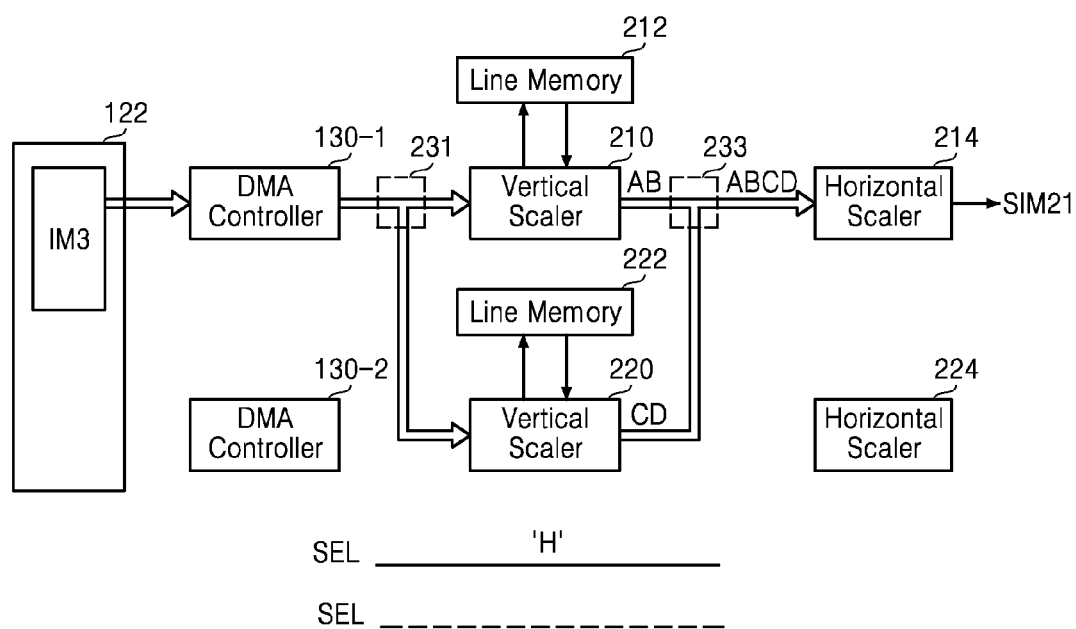
FIG. 3 is a block diagram further describing operation of the scalers shown in FIG. 1 that scale an image having a second resolution greater than the first resolution.
Figure 4:
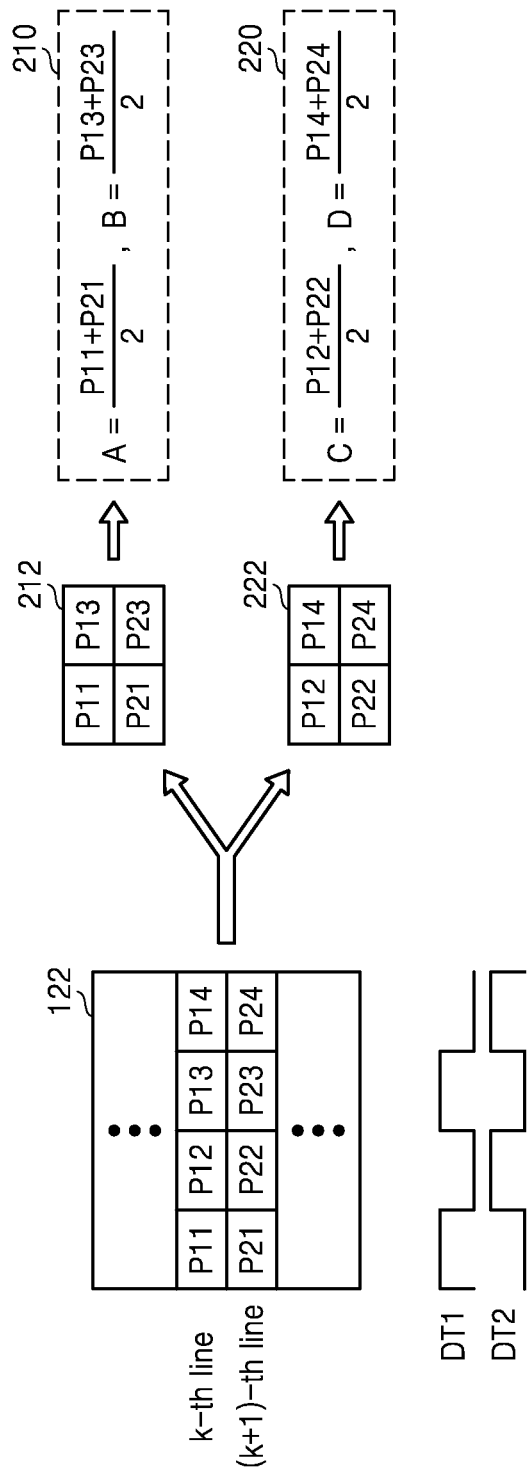
FIG. 4 is a conceptual diagram illustrating operation of the vertical scalers shown in FIG. 1.

FIG. 3 is a block diagram describing operation of the scalers shown in FIG. 1 that scale an image having the second resolution, greater than the first resolution. FIG. 4 is a conceptual diagram further describing the operation of the vertical scalers shown in FIG. 1. When it is assumed that the selection signal generation circuit 136 outputs a high selection signal SEL, operation of the salers 132-1 and 132-2 may be understood from the following description taken in conjunction with FIGS. 1, 3, and 4. When resolution of an image to be processed by the processor 120 is the second resolution, only the first DMA controller 130-1 is enabled by the CPU 242.

An output terminal of the first DMA controller 130-1 is connected to an input terminal (0) of the first selector 230 and an input terminal of the distributor 231. The distributor 231 may transfer a first group of pixels among the pixels output by the first DMA controller 130-1 to an input terminal (1) of the first selector 230, and transfer a second group of pixels among the pixels output by the first DMA controller 130-1 to an input terminal (1) of the second selector 232 under the control of the CPU 242.

An output terminal of the first vertical scaler 210 is connected to an input terminal (0) of the third selector 234 and an input terminal of a merger 233. The merger 233 may be used to merge (or combine) pixels output from the first vertical scaler 210 and pixels output from the fourth selector 236, and output the merged pixels to the third selector 234 under the control of the CPU 242.

The second selector 232 may isolate or separate the second vertical scaler 220 from the second DMA controller 130-2 and connect the distributor 231 and the second vertical scaler 220 according to the high (second level) selection signal SEL. Accordingly, the first scaler 132-1 may additionally use the second vertical scaler 220. Based on resolution of an image to be processed by the processor 120, the second vertical scaler 220 may be used by the first scaler 132-1, or may be used by the second scaler 132-2. That is, the second vertical scaler 220 has a configuration that enables its operational capabilities to be shared as a resource between the first scaler 132-1 and the second scaler 132-2.

As noted above, it is assumed that the first DMA controller 130-1 includes a memory (or buffer) which can store pixels included in one or more lines included in an image IM1 or IM3 so as to reduce a read access frequency with respect to the system memory 122. Moreover, for convenience of description, it is assumed that the number of pixels included in each line is four. Each pixel may include RGB data or YCbCR (YUV) data.

From the foregoing description of FIGS. 1, 2 and 3, it will be understood that the selection signal SEL—based on the resolution of an image to be processed—may be used to essentially select an operating mode for the selection circuit 134. For example, in a first operating mode selected by a low selection signal, the selection circuit 134 will operate as described in relation to FIG. 2, but in a second operating mode selected by a high selection signal, the selection circuit 134 will operate as described in relation to FIG. 3.

As shown in FIG. 4, it is assumed that the first DMA controller 130-1 reads pixels P11, P12, P13, and P14 of a $k^{th}$ line and pixels P21, P22, P23, and P24 of $(k+1)^{th}$ line, and store pixels P11, P12, P13, P14, P21, P22, P23, and P24 in an internal memory (or buffer) of the first DMA controller 130-1. When a first (low) distribution signal DT1 is generated, the first DMA controller 130-1 may transmit a first group P11 and P13 among the pixels P11, P12, P13, and P14 of a $k^{th}$ line included in the third image IM3 having second resolution to an input terminal (1) of the first selector 230. The first selector 230 may transmit the first group P11 and P13 to the first vertical scaler 210 in response to the high selection signal SEL. The first vertical scaler 210 may stores the first group P11 and P13 transmitted through the first selector 230 in the first line memory 212.

When a second (high) distribution signal DT2 is generated, the first DMA controller 130-1 may transmit a second group P12 and P14 among the pixels P11, P12, P13, and P14 of a $k^{th}$ line included in the third image IM3 having second resolution to an input terminal (1) of the second selector 232. The second selector 232 may transmit the second group P12 and P14 to the second vertical scaler 220 in response to the high selection signal SEL. The second vertical scaler 220 may store the second group P12 and P14 transferred by the second selector 232 in a second line memory 222.

When the first distribution signal DT1 is high, the first DMA controller 130-1 may transmit a first group P21 and P23 among the pixels P21, P22, P23, and P24 of a $(k+1)^{th}$ line included in the third image IM3 having second resolution to an input terminal (1) of the first selector 230. The first selector 230 may transmit the first group P21 and P23 to the first vertical scaler 210 in response to the high selection signal SEL. The first vertical scaler 210 may store the first group P21 and P23 transferred by the first selector 230 in the first line memory 212.

When the second distribution signal DT2 is high, the first DMA controller 130-1 may transmit a second group P22 and P24 among the pixels P21, P22, P23, and P24 of a $(k+1)^{th}$ line included in the third image IM3 having second resolution to an input terminal (1) of the second selector 232. The second selector 232 may transmit the second group P22 and P24 to the second vertical scaler 220 in response to the high selection signal SEL. The second vertical scaler 220 may store the second group P22 and P24 transferred by the second selector 232 in the second line memory 222.

As described referring to FIG. 4, odd numbered pixels P11 and P13 among the pixels P11, P12, P13, and P14 of a $k^{th}$ line may be sequentially stored in the first line memory 212 by a control of the first vertical scaler 210, and even numbered pixels P12 and P14 among the pixels P11, P12, P13, and P14 of a $k^{th}$ line may be sequentially stored in the second line memory 222 by a control of the second vertical scaler 220. Moreover, odd numbered pixels P21 and P23 among the pixels P21, P22, P23, and P24 of a $(k+1)^{th}$ line may be sequentially stored in the first line memory 212 by a control of the first vertical scaler 210, and even numbered pixels P22 and P24 among the pixels P21, P22, P23, and P24 of a $(k+1)^{th}$ line may be sequentially stored in the second line memory 222 by a control of the second vertical scaler 220.

Thus, the first vertical scaler 210 performs vertical scaling on a first group of pixels P11, P13, P21, and P23 stored in the first line memory 212 on a column basis. In parallel with the operation of the first vertical scaler 210, the second vertical scaler 220 performs vertical scaling on a second group of pixels P12, P14, P22, and P24 stored in the second line memory 222 on a column basis. For example, the first vertical scaler 210 may perform vertical scaling on pixels P11 and P21, and P13 and P23, and generate vertically scaled pixels A and B. Moreover, the second vertical scaler 220 vertically scales pixels P12 and P22, and P14 and P24, and generate vertically scaled pixels C and D. A method of generating average values of corresponding pixels is shown in FIG. 4 as a method of generating vertically scaled pixels A, B, C, and D—however, this is just a selected example of how the illustrated embodiment may be operated. Other approaches, such as using an interpolation method, may be used to generate the vertically scaled pixels A, B, C, and D. The fourth selector 236 may transmit pixels C and D output from the second vertical scaler 220 to the merger 233 in response to the high selection signal SEL.

The merger 233 may now be used to merge vertically scaled pixels A and B provided by the first vertical scaler 210 with vertically scaled pixels C and D provided by the second vertical scaler 220. The merged pixels ABCD are provided to an input terminal (1) of the third selector 234 under the control of the CPU 240. Accordingly, the third selector 234 may transmit the merged pixels ABCD to the first horizontal scaler 214 in response to the high selection signal SEL. Thereafter, the first horizontal scaler 214 may horizontally scale the merged pixels ABCD, that is, the vertically scaled pixels ABCD are output as horizontally scaled pixels SIM21.

Figure 5:
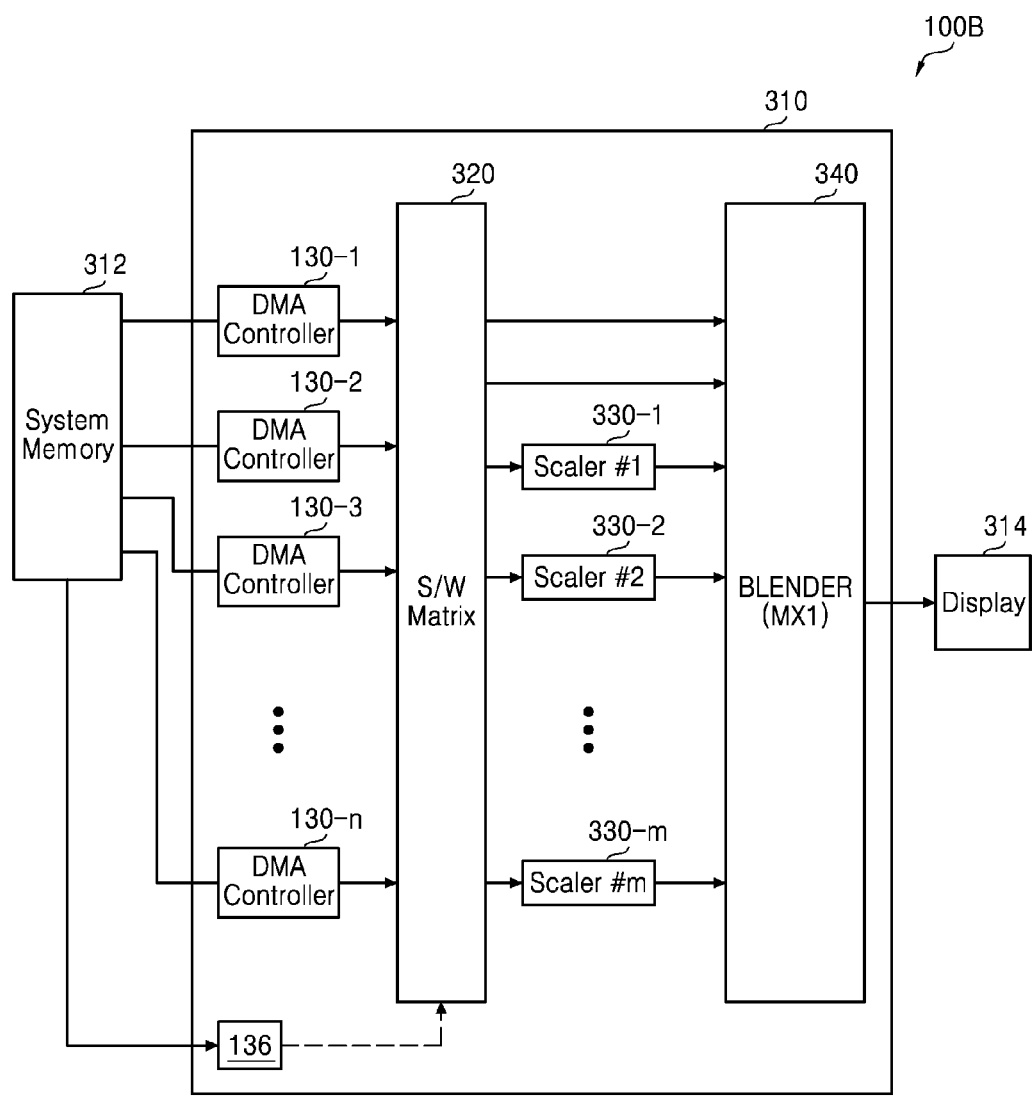
FIG. 5 is a block diagram illustrating an image processing system according to another embodiment of the inventive concept.

FIG. 5 is a block diagram of an image processing system according to another embodiment of the inventive concept. Referring to the foregoing embodiments and FIG. 5, an image processing system 100B includes; a processor 310, a system memory 312, and a display 314. The image processing system 100B may be embodied as a PC, a desktop computer, a laptop computer, a workstation computer, or a portable (or mobile) computing device.

The processor 310 includes a plurality of 'n' DMA controllers 130-1 to 130-$n$, where n is a natural number greater than 2, the selection signal generation circuit 136, a switch matrix 320, a plurality of 'm' scalers 330-1 to 330-$m$, where m is a natural number greater than 1, and a blender 340.

The configuration and operation of each of the plurality of DMA controllers 130-1 to 130-$n$ may be substantially the same as the configuration and operation of the DMA controller 130-1 previously described in relation to FIG. 1.

Based on resolution of an image to be processed by the processor 310, the selection signal generation circuit 136 determines the image type, generates selection signal(s) corresponding to the image type determination, and transmits the selection signal(s) to the switch matrix 320 and the plurality of scalers 330-1 to 330-$m$. Here, the selection signal(s) may be variously defined and may one or more selection signals.

The switch matrix 320 transmit pixels output from at least one of the plurality of DMA controllers 130-1 to 130-$n$ to at least one scaler of a plurality of scalers 330-1 to 330-$m$, or the blender 340 in response to the selection signal(s). For example, when pixels output by at least one of the plurality of DMA controllers 130-1 to 130-$n$ are user interfaces (UIs), the switch matrix 320 may directly transmit pixels corresponding to the UI to the blender 340 based on the selection signal(s).

Each of the plurality of scalers 330-1 to 330-$m$ may include the first scaler 132-1, second scaler 132-2, and selection circuit 134 of FIG. 1. Accordingly, the configuration and operation of elements 132-1, 132-2, and 134 included in each of the plurality of scalers 330-1 to 330-$m$ may be substantially the same as or similar to the configuration and operation of elements 132-1, 132-2, and 134 described with reference to FIGS. 1, 2, 3 and/or 4.

The blender 240 receives pixels output from the switch matrix 320, and vertically and horizontally scaled pixels output from at least one of the plurality of scalers 330-1 to 330-$m$, blends the received pixels, and transmits display data (blended pixels) to the display 314. For example, the display data may be transferred to a display 314 via a MIPI® display serial interface (DSI).

Figure 6:
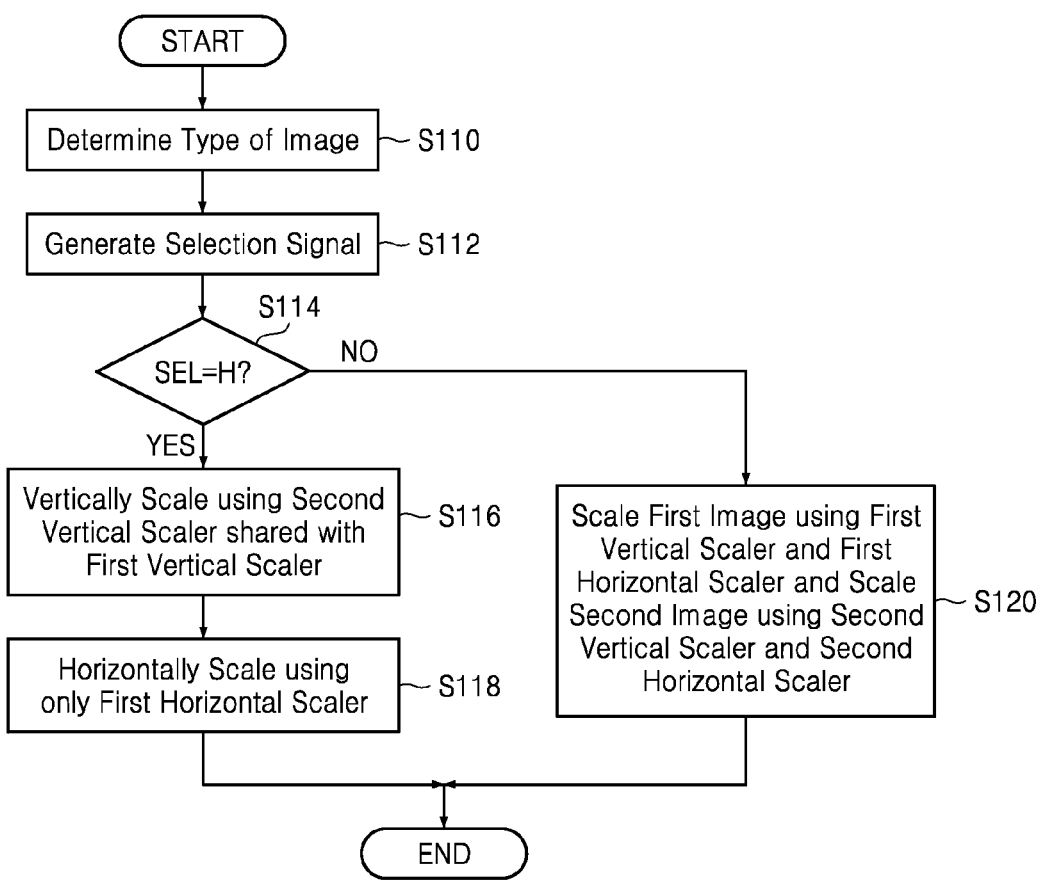
FIG. 6 is a flowchart summarizing the operation of an image processing system according to embodiments of the inventive concept, like those illustrated in FIGS. 1 and 5.

FIG. 6 is a flowchart summarizing operation of an image processing system consistent with certain embodiments of the inventive concept, like those shown in FIGS. 1, 2, 3, 4 and/or 5. Referring to the foregoing embodiments and FIG. 6, the controller 240 may be used to determine a type of an image based on resolution of the image to be processed by the processor 120 or 310 (S110). The selection signal generation circuit 136 may be used to generate a selection signal SEL corresponding to a determined image type (S112).

When resolution of an image to be processed by the processor 120 is the second resolution, and the selection signal SEL may be high (e.g., waveform shown in FIG. 3) (S114), the first vertical scaler 210 of the first scaler 132-1 vertically scales pixels stored in the first line memory 212, and the second vertical scaler 220 shared by the first scaler 132-1 and the second scaler 132-2 vertically scales pixels stored in the second line memory 222 (S116).

The first horizontal scaler 214 may receive the pixels vertically scaled by the first vertical scaler 210 and the pixels vertically scaled by the second vertical scaler 220, and horizontally scales the received pixels (S118). At this time, the pixels vertically scaled by the second vertical scaler 220 are not transmitted to the second horizontal scaler 224 according to an operation of the fourth selector 236.

However, when resolution of an image to be processed by the processor 120 is the first resolution, and the selection signal SEL may be low (e.g., waveform shown in FIG. 2) (S114), the first scaler 132-1 may vertically and horizontally scale a first image IM1, and generate the vertically and horizontally scaled image SIM11 using the first vertical scaler 210 and the first horizontal scaler 214 as described with reference to FIG. 2 (S120).

In parallel (or simultaneously, meaning overlapping at least in part) with an operation of the scaler 132-1, the second scaler 132-2 may vertically and horizontally scale a second image IM2, and generate vertically and horizontally scaled image SIM12 using the second vertical scaler 220 and the second horizontal scaler 224, and generate the vertically and horizontally scaled image SIM12 (S120).

Figure 7:
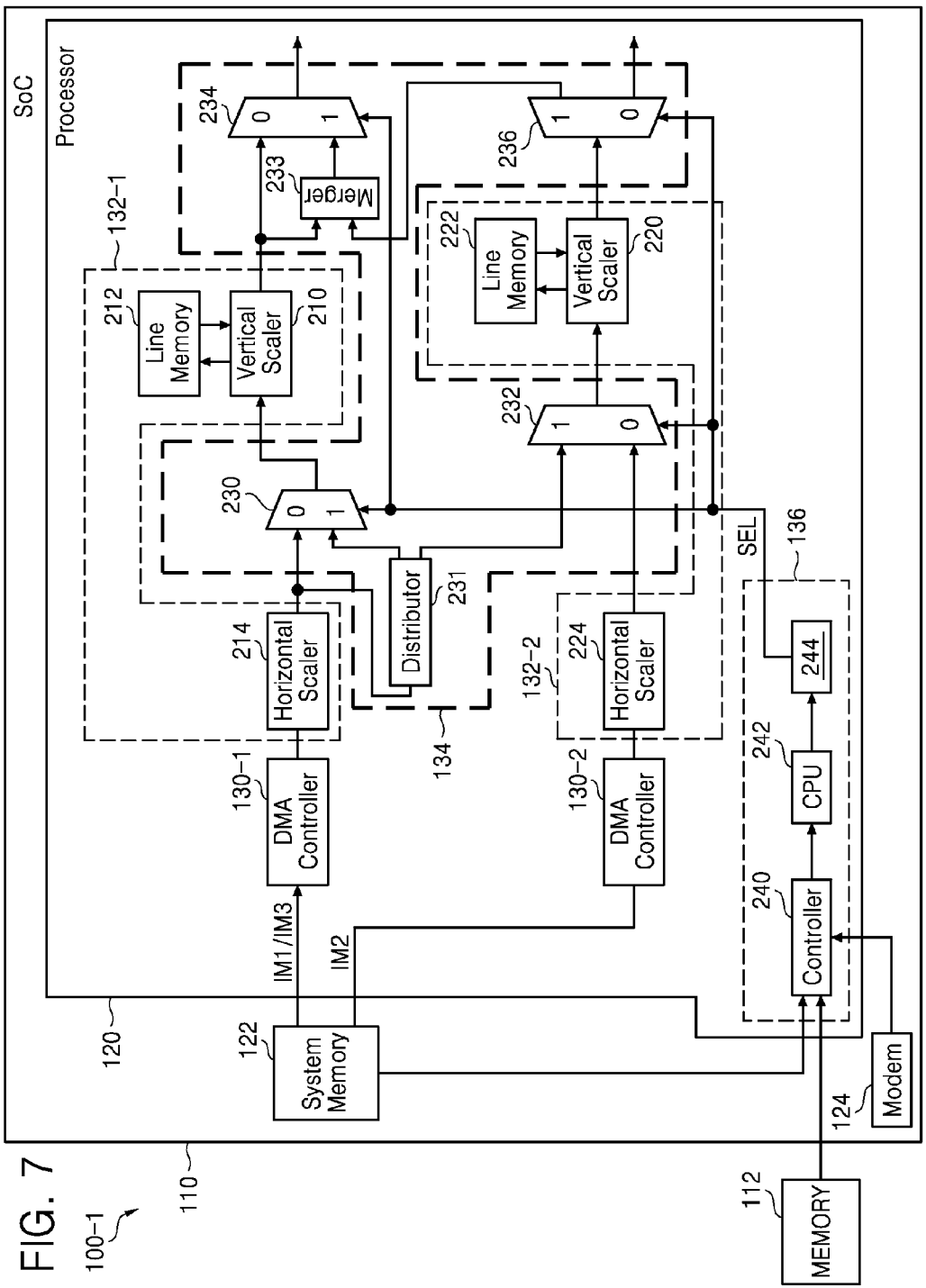
FIG. 7 is a block diagram illustrating an image processing system according to still another embodiment of the inventive concept.

FIG. 7 is a block diagram of an image processing system according to still another embodiment of the inventive concept. Referring to FIG. 7, an image processing system 100-1 generally includes a processing circuit 110 and a memory 112. The image processing system 100-1 may be a PC, a desktop computer, a laptop computer, a workstation computer, or a portable (or mobile) computing device.

The processing circuit 110 may be embodied as an integrated circuit (IC), a system on chip (SoC), an application processor (AP), or a mobile AP. The processor 120 may include the DMA controllers 130-1 and 130-2, the first scaler 132-1, the second scaler 132-2, the selection circuit 134, and the selection signal generation circuit 136.

Except that an input terminal of the first horizontal scaler 214 is connected to an output terminal of the first DMA controller 130-1, and an input terminal of the second horizontal scaler 224 is connected to an output terminal of the second DMA controller 130-2, the configuration and operation of the image processing system 100-1 shown in FIG. 7 are substantially the same as or similar to the configuration and operation of the image processing system 100 shown in FIG. 1.

The first horizontal scaler 214 may horizontally scale pixels included in image IM1 or IM3 output from the first DMA controller 130-1 and output horizontally scaled pixels to an input terminal (0) of the first selection circuit 230 and an input terminal of the distributor 231. The second horizontal scaler 224 may horizontally scale pixels included in an image IM2 output from the second DMA controller 130-2, and output horizontally scaled pixels to an input terminal (0) of the second selection circuit 232.

Figure 8:
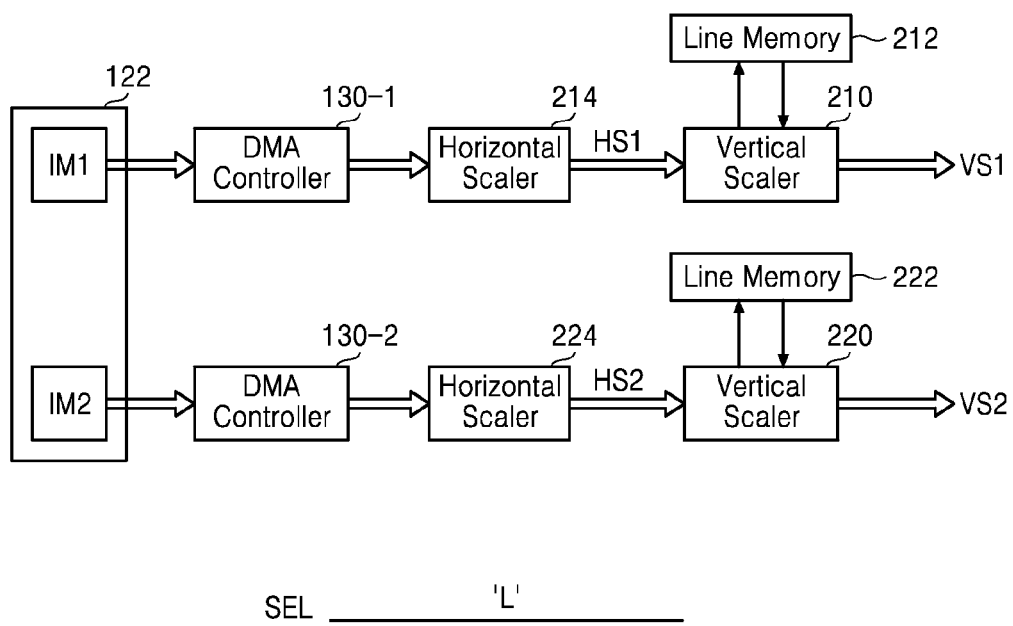
FIG. 8 is a block diagram further describing operation of the scalers shown in FIG. 7 that scale images each having the first resolution.

FIG. 8 is a block diagram describing operation of the scalers shown in FIG. 7 that scale images each having the first resolution. When the selection signal generation circuit 136 is low (first level), the operation of the scalers 132-1 and 132-2 may be understood from the following description with reference to FIGS. 7 and 8. When resolution of an image to be processed by the processor 120 is the first resolution, it is assumed that each of the DMA controllers 130-1 and 130-2 is enabled under the control of the CPU 242.

The first horizontal scaler 214 is connected to the first vertical scaler 210 through the first selector 230, and the second horizontal scaler 224 is connected to the second vertical scaler 220 through the second selector 232. The first horizontal scaler 214 may horizontally scale pixels included in the first image IM1 having first resolution, which are output from the first DMA controller 130-1, and transmit horizontally scaled pixels HS1 to the first vertical scaler 210. In parallel with the operation of the first horizontal scaler 214, the second horizontal scaler 224 may horizontally scale pixels included in the second image IM2 having first resolution, which are output from the second DMA controller 130-2, and transmit horizontally scaled pixels HS2 to the second vertical scaler 220.

The first vertical scaler 210 may store horizontally scaled pixels HS1 to the first line memory 212, vertically scale pixels stored in the first line memory 212, and output vertically scaled pixels VS1 through the third selector 234. In parallel with an operation of the first vertical scaler 210, the second vertical scaler 220 may store horizontally scaled pixels HS2 in the second line memory 222, vertically scale pixels stored in the second line memory 222, and output vertically scaled pixels VS2 through the fourth selector 236.

Figure 9:
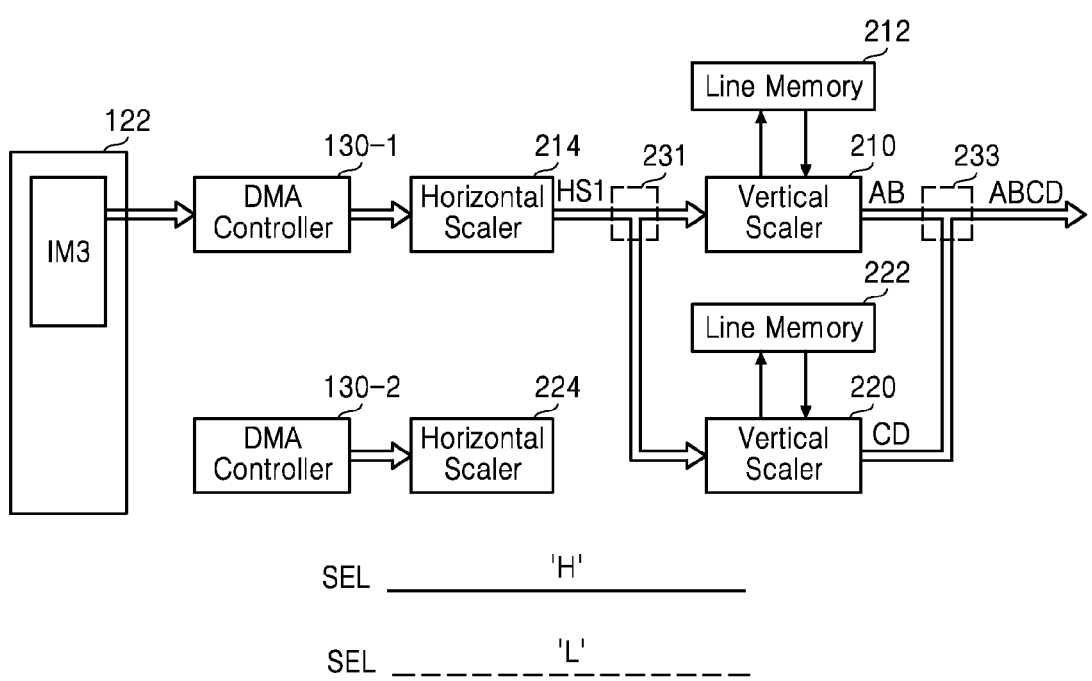
FIG. 9 is a block diagram further describing operation of the scalers shown in FIG. 7 that scale an image having the second resolution.

FIG. 9 is a block diagram describing operation of the scalers shown in FIG. 7 that scale an image having the second resolution greater than the first resolution. When the selection signal generation circuit 136 is high (second level), the operation of the scalers 132-1 and 132-2 may be understood from the following description with reference to FIGS. 4, 7, and 9.

When resolution of an image to be processed by the processor 120 is the second resolution, it is assumed that only the first DMA controller 130-1 is enabled by the CPU 242. The first horizontal scaler 214 may horizontally scale pixels included in the third image IM3 having second resolution, which are output from the first DMA controller 130-1, and transmit horizontally scaled pixels HS1 to an input terminal (0) of the first selector 230 and an input terminal of the distributor 231.

The distributor 231 may transmit a first group of pixels of the horizontally scaled pixels HS1 to an input terminal (1) of the first selector 230, and transmit a second group of pixels of the pixels to an input terminal (1) of the second selector 232 under the control of the CPU 242. An output terminal of the first vertical scaler 210 is connected to an input terminal (0) of the third selector 234 and an input terminal of the merger 233. The merger 233 may be used to merge pixels output from the first vertical scaler 210 with pixels output from the fourth selector 236, and output the merged pixels to the third selector 234 under the control of the CPU 242.

Figure 10:
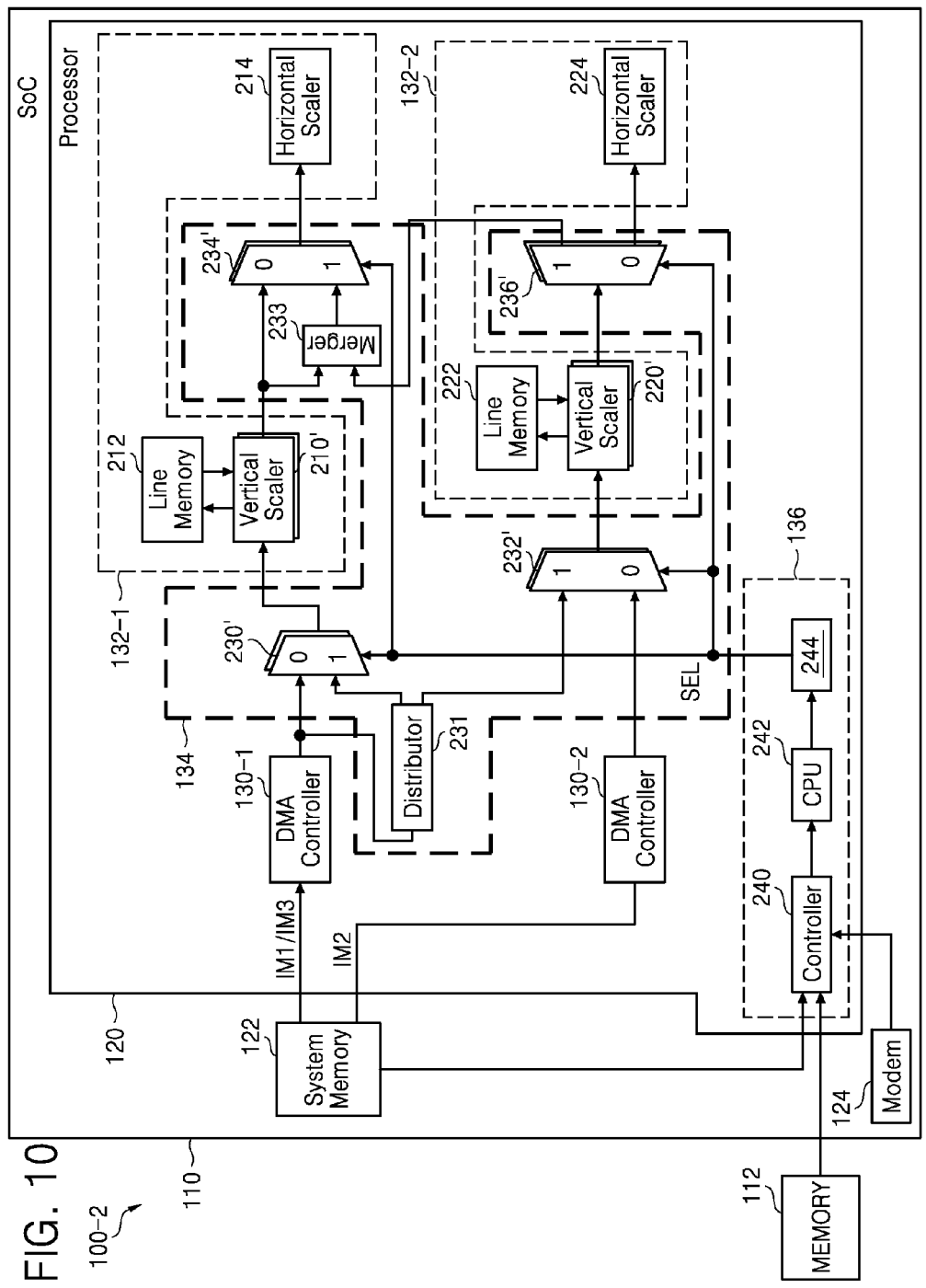
FIG. 10 is a block diagram illustrating an image processing system according to still another embodiment of the inventive concept.

FIG. 10 is a block diagram of an image processing system according to still another embodiment of the inventive concept. Referring to FIGS. 1 and 10, except that each of selectors 230', 232', 234', and 236' includes a plurality of selectors and each of vertical scalers 210' and 220' includes a plurality of scalers, the configuration and operation of the data processing system 100-2 shown in FIG. 10 are substantially the same as or similar to the configuration and operation of the data processing system 100 shown in FIG. 1.

Figure 11:
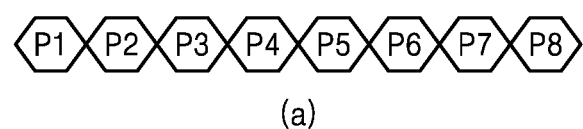
FIG. 11 is a conceptual diagram describing pixels processing in relation to a clock signal.
Figure 11:
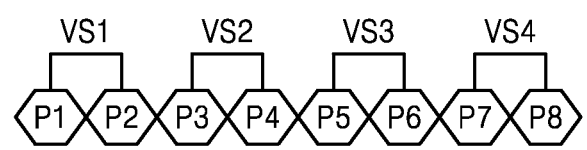

FIG. 11, inclusive of FIGS. 11A and 11B, is a conceptual diagram describing pixel processing in response to a clock signal. Referring to FIGS. 10 and 11A, it is assumed that a first vertical scaler 210' includes four scalers, the first selector 230' includes four selectors, a second vertical scaler 220' includes four scalers, the second selector 232' includes four selectors, a third selector 234' includes four selectors, each of the horizontal scalers 214 and 224 includes one horizontal scaler, each of the vertical scalers 210' and 220' vertically scales one pixel per clock signal, the first horizontal scaler 214 horizontally scales four pixels per the clock signal, and the second horizontal scaler 224 horizontally scales one pixel, two pixels, or four pixels per the clock signal.

Operation of a first scaler 132-1, first selectors 230', and third selectors 234' are as follows. The distributor 231 may transmit a corresponding pixel of four pixels P1 to P4 to a corresponding selector of four selectors 230'.

A corresponding pixel of four pixels P1 to P4 may be transmitted to a corresponding vertical scaler of four vertical scalers 210' through a corresponding selector of four selectors 230'. Moreover, the distributor 231 may transmit a corresponding pixel of four pixels P5 to P8 to a corresponding selector of four selectors 230'. A corresponding pixel of four pixels may be transmitted to a corresponding vertical scaler of four vertical scalers 210' through a corresponding selector of four selectors 230'.

Operation of the second scaler 132-2, second selectors 232', and fourth selectors 236' are substantially the same as or similar to the operation of the first scaler 132-1, the first selectors 230', and the third selectors 234'.

Referring to FIGS. 10 and 11B, it is assumed that the first vertical scaler 210' includes four scalers, the first selector 230' includes four selectors, the second vertical scaler 220' includes four scalers, the second selector 232' includes four selectors, the third selector 234' includes four selectors, each of the horizontal scalers 214 and 224 includes one horizontal scaler, each of the vertical scalers 210' and 220' vertically scales two pixels per clock signal, the first horizontal scaler 214 horizontally scales four pixels per the clock signal, and the second horizontal scaler 224 horizontally scales one pixel, two pixels, or four pixels per the clock signal.

Operation of the first scaler 132-1, the first selectors 230', and the third selectors 234' are as follows. A pair of corresponding pixels P1 and P2, P3 and P4, P5 and P6, and P7 and P8 among eight pixels P1 to P8 are transferred to a corresponding vertical scaler among four vertical scalers 210' through a corresponding selector among four selectors 230'. That is, a corresponding vertical scaler among four vertical scalers 210' vertically scales pixels in a pair VS1, VS2, VS3, and VS4.

Operation of the second scaler 132-2, the second selectors 232', and the fourth selectors 236' are substantially the same as or similar to operations of the first scaler 132-1, the first selectors 230', and the third selector 234'.

As described above, the distributor 231 may transmit one or more pixels to a corresponding selector among a plurality of first selectors 230' or a corresponding selector among a plurality of second selectors 232'. The merger 233 may merge at least one pixel output from a corresponding vertical scaler among a plurality of first vertical scalers 210' and at least one pixel output from a corresponding selector among a plurality of four selectors 236'.

In an application processor including scalers according to embodiments of the inventive concepts, some of the scaler(s) may be shared as resource(s) based on the resolution of the image being processed. Thus, an application processor including scalers according to embodiments of the inventive concepts are able to reduce power consumption, and yet still scale an image on-the-fly using parallel processing.

Although a few embodiments of the present general inventive concept have been shown and described, it will be appreciated by those skilled in the art that changes may be made in these embodiments without departing from the scope of the following claims and their equivalents.

What is claimed is:

1. An application processor comprising:
a first scaler including a first vertical scaler and a first horizontal scaler;
a second scaler including a second vertical scaler and a second horizontal scaler,
wherein the second vertical scaler is shared between the first scaler and the second scaler; and
a selection circuit that is configured to connect the second vertical scaler in parallel with the first vertical scaler, disconnect the second horizontal scaler from the second vertical scaler, and connect the first and second vertical scalers to the first horizontal scaler, in response to a selection signal generated based on a resolution of an image to be processed.

2. The application processor of claim 1, further comprising:
a selection signal generation circuit that determines an image type for the image to be processed based on the resolution of the image, and generates the selection signal in response to the determination of the image type, wherein
in a first operating mode selected by the selection signal indicating a first image type, the selection circuit is configured to transmit a group of pixels corresponding to a first image of the first image type to the first vertical scaler, and in parallel, to transmit a group of pixels corresponding to a second image of the first image type to the second vertical scaler, and
in a second operating mode selected by the selection signal indicating a second image type, the selection circuit is configured to transmit a first group of pixels corresponding to a third image of the second type to the first vertical scaler, and also, transmit a second group of pixels corresponding to the third image to the second vertical scaler.

3. The application processor of claim 2, further comprising:
a first direct memory access (DMA) controller configured to output at least one of the group of pixels corresponding to the first image, and the first and second groups of pixels corresponding to the third image; and
a second DMA controller configured to output the group of pixels corresponding to the second image.

4. The application processor of claim 2, wherein the selection circuit in the first operating mode is further configured to output vertically scaled pixels provided by the first vertical scaler to the first horizontal scaler, and to output vertically scaled pixels provided by the second vertical scaler to the second horizontal scaler, and
the selection circuit in the second operating mode is configured to output vertically scaled pixels provided by the second vertical scaler to only the first horizontal scaler.

5. The application processor of claim 2, wherein the selection signal generation circuit determines the first image type when the image to be processed has a first resolution, and determines the second image type when the image to be processed has a second resolution, greater than the first resolution.

6. The application processor of claim 2, further comprising:
a first line memory configured to store at least one of the group of pixels corresponding to the first image, and a group of vertically scaled pixels received from the first vertical scaler; and
a second line memory configured to store at least one of the group of pixels corresponding to the second image, and a group vertically scaled pixels received from the second vertical scaler.

7. The application processor of claim 1, wherein the first horizontal scaler has the largest pixel throughput among the first vertical scaler, the first horizontal scaler, the second vertical scaler, and the second horizontal scaler.

8. The application processor of claim 1, further comprising:
a selection signal generation circuit that determines the image type for the image to be processed based on the resolution of the image, and generates selection information corresponding to the determination of image type,
wherein the selection circuit is selectively configured in response to the selection signal generated based on the selection information, wherein in a first operating mode selected by the selection signal indicating a first image type the selection circuit enables parallel and independent operation of the first vertical scaler and the second vertical scaler, together with parallel and independent operation of the first horizontal scaler and the second horizontal scaler, and
in a second operating mode selected by the selection signal indicating a second image type the selection circuit enables shared operation of the first vertical scaler and the second vertical scaler, together with operation of only the first horizontal scaler.

9. A system on chip comprising:
an image source that provides images including a first image, a second image, and a third image, each having one of a plurality of image types including a first image type and a second image type;
a first scaler including a first vertical scaler and a first horizontal scaler; and
a second scaler including a second vertical scaler and a second horizontal scaler,
wherein upon determining that the first image and the second image are respectively the first image type, the first vertical scaler vertically scales a first group of pixels corresponding to the first image, and in parallel, the second vertical scaler vertically scales a second group of pixels corresponding to the second image, and
upon determining that the third image is the second image type, the first vertical scaler together with the second vertical scaler vertically scale a third group of pixels corresponding to the third image.

10. The system on chip of claim 9, wherein the first horizontal scaler horizontally scales vertically scaled pixels provided by the first vertical scaler together with vertically scaled pixels provided by the second vertical scaler.

11. The system on chip of claim 9, further comprising:
a selection circuit that selectively connects the second vertical scaler with the first vertical scaler and disconnects the second horizontal scaler from the second vertical scaler in response to a selection signal indicating that an image received from the image source is the second image type.

12. The system on chip of claim 11, further comprising:
a selection signal generation circuit that determines one of the plurality of image types for an image based on resolution of the image, and generates the selection signal corresponding to the determination of the image type, wherein upon determining the first image type for the image, the selection circuit connects the first vertical scaler with the first horizontal scaler, and connects the second vertical scaler with the second horizontal scaler, and upon determining the second image type for the image, the selection circuit connects the first vertical scaler and the second vertical scaler in parallel and connects the parallel combination of the first vertical scaler and the second vertical scaler to the first horizontal scaler, and disconnects the second horizontal scaler from the second vertical scaler.

13. The system on chip of claim 9, further comprising:
a first direct memory access (DMA) controller that transmits the first group of pixels corresponding to the first image to the first vertical scaler, and transmits the third group of pixels corresponding to the third image to the first vertical scaler and the second vertical scaler; and
a second DMA controller that transmits the second group of pixels corresponding to the second image to the second vertical scaler.

14. The system on chip of claim 13, wherein the first image and the second image respectively have a first resolution and the third image has a second resolution greater than the first resolution.

15. The system on chip of claim 9, wherein the first horizontal scaler has the largest pixel throughput among the first vertical scaler, the first horizontal scaler, the second vertical scaler, and the second horizontal scaler.

16. The system on chip of claim 9, wherein the first group of pixels and the second group of pixels are sequentially transferred to the first vertical scaler and the second vertical scaler on-the-fly.

17. The system on chip of claim 9, wherein the image source is one of a memory, a camera, and a modem.

18. A method of operating an image processing system including a processor including N direct memory access (DMA) controllers, a switch matrix, and M scalers, wherein each one of the M scalers includes a vertical scaler and a horizontal scaler, and 'N' and 'M' are natural numbers greater than two, the method comprising:
providing an image from an image source to the processor;
determining an image type for the image based on resolution of the image;
generating a selection signal in response to the determination of the image type; and
configuring the switch matrix in response to the selection signal to selectively configure an arrangement of the DMA controllers and the scalers to process the image,
wherein upon determining that the image is a first image type, the arrangement of the DMA controllers and the scalers includes Q DMA controllers, Q vertical scalers and Q horizontal scalers, 'Q' being a natural number less than N and M, and
upon determining that the image is a second image type, the arrangement of the DMA controllers and the scalers includes R DMA controllers, P vertical scalers and R horizontal scalers, where 'R' is a natural number less than Q, and 'P' is a natural number greater than R.

19. The method of claim 18, wherein the image is determined to be the first image type when the resolution of the image is a first resolution, and the image is determined to be the second image type when the resolution of the image is a second resolution greater than the first resolution.

* * * * *